H. A. KUHN & W. W. MACFARREN.
MINING MACHINE.
APPLICATION FILED JAN. 14, 1909.
1,273,503.
Patented July 23, 1918.
3 SHEETS—SHEET 2.
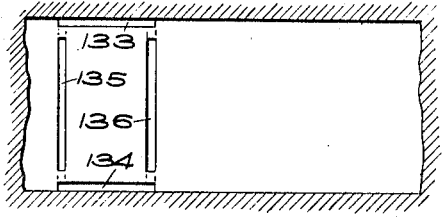
FIG. 9
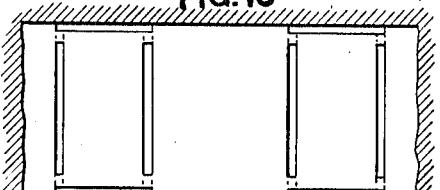
FIG. 10
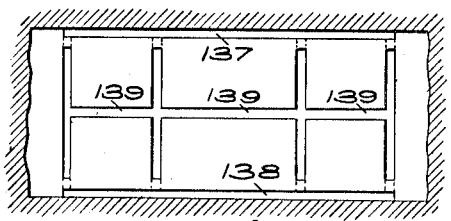
FIG. 11
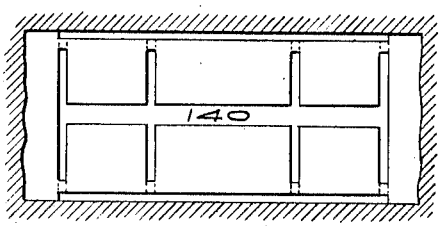
FIG. 12
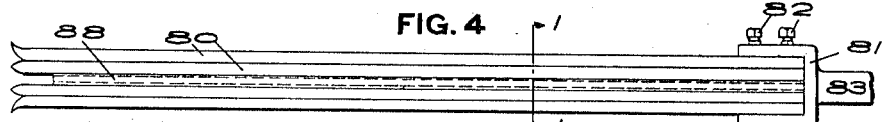
FIG. 4
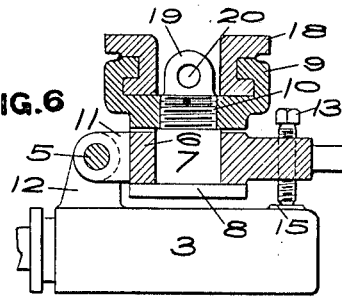
FIG. 6
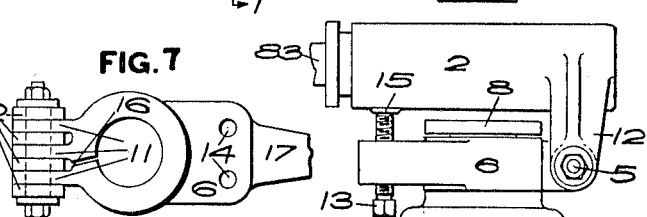
FIG. 7 FIG. 8
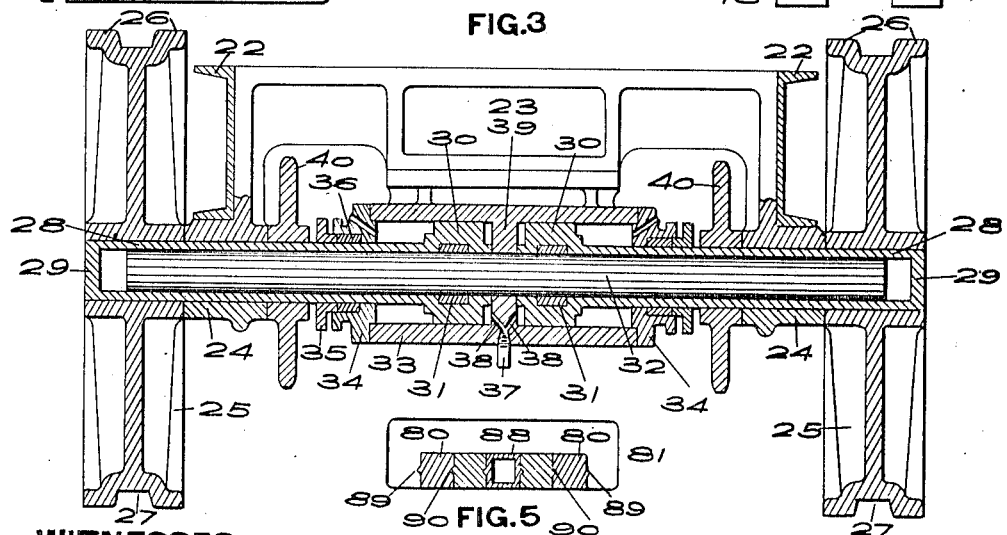
FIG. 3
FIG. 5
WITNESSES
Chas. Soderman
Estelle M. Johnson
INVENTORS
Harry A. Kuhn
Walter W. Macfarren H. A. KUHN & W. W. MACFARREN.
MINING MACHINE.
APPLICATION FILED JAN. 14, 1909.
1,273,503.
Patented July 23, 1918.
3 SHEETS—SHEET 3.
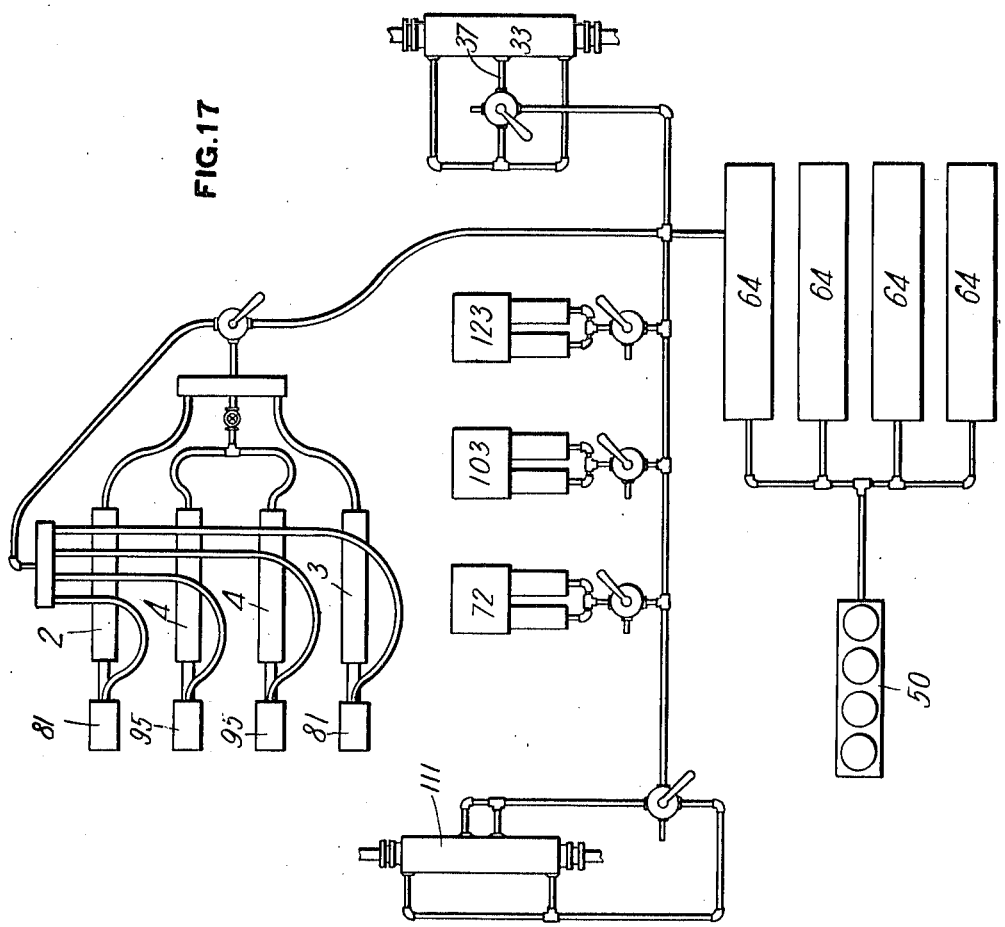
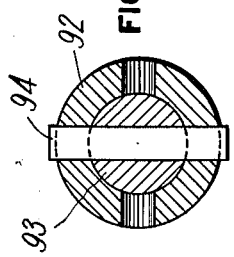
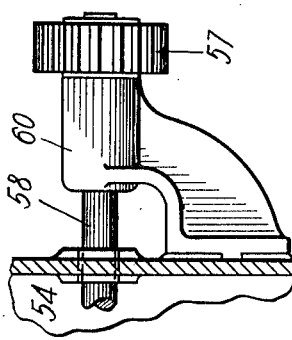
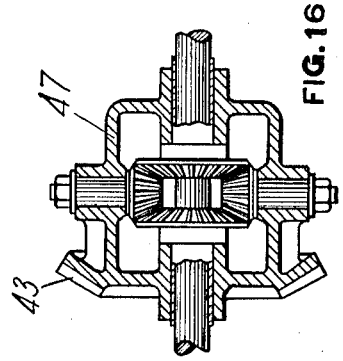
WITNESSES
Chas. Fotterman
Estelle M. Johnson
INVENTORS
Harry A. Kuhn
Walter W. Macfarren

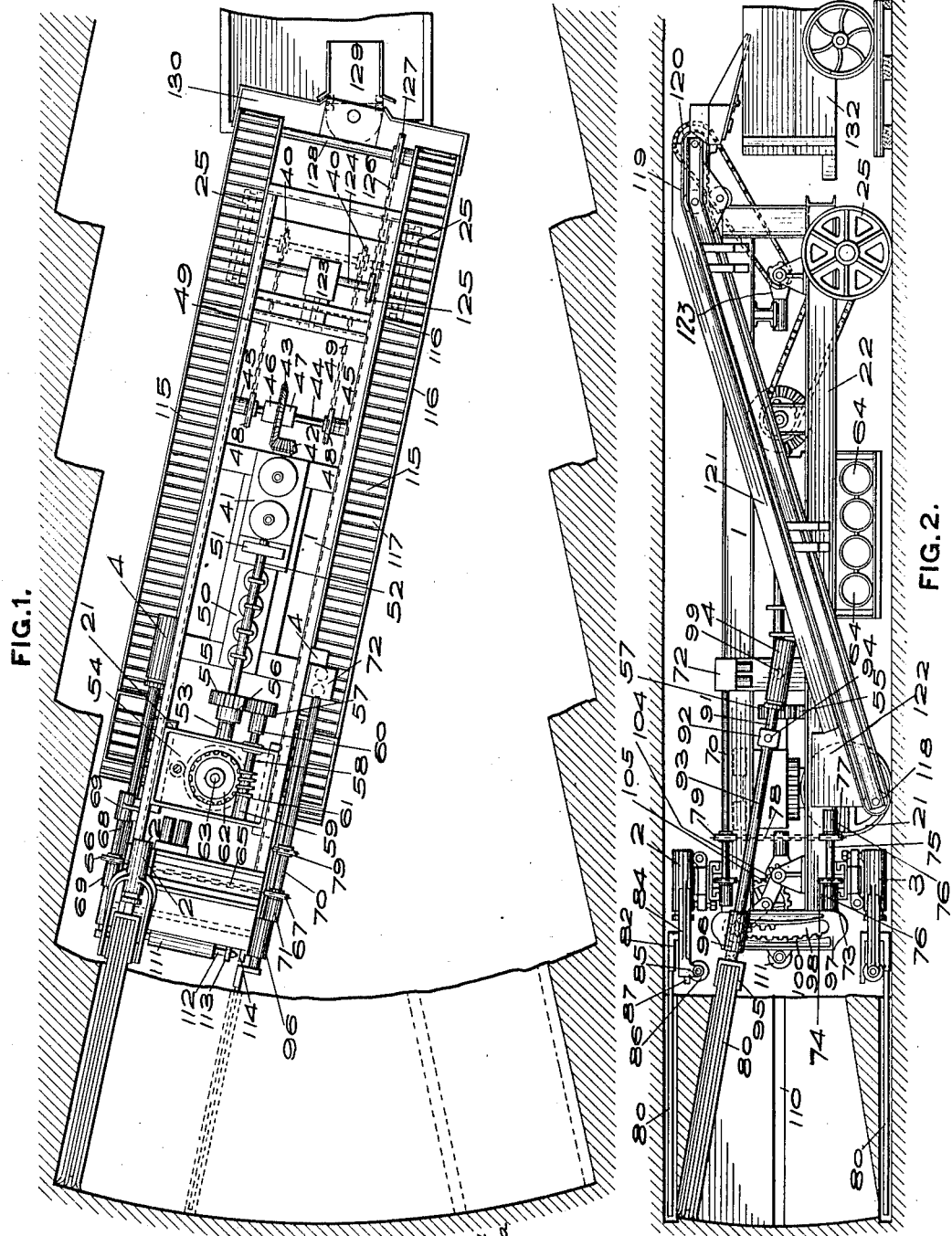

UNITED STATES PATENT OFFICE.

HARRY A. KUHN AND WALTER W. MACFARREN, OF PITTSBURGH, PENNSYLVANIA; SAID MACFARREN ASSIGNOR TO SAID KUHN.

MINING-MACHINE.

1,273,503.        Specification of Letters Patent.        Patented July 23, 1918.

Application filed January 14, 1909. Serial No. 472,304.

*To all whom it may concern:*

Be it known that we, HARRY A. KUHN and WALTER W. MACFARREN, citizens of the United States, residing at Pittsburgh, in the county of Allegheny and State of Pennsylvania, have invented certain new and useful Improvements in Mining-Machines, of which the following is a specification.

The objects of our invention are:—first, to provide a machine which will mine the entire thickness of a seam of coal; second, to provide a machine which will mine the major part of the coal in very large lumps; third, to provide a machine which will make only a very small percentage of slack, it being entirely feasible to so design a machine according to the present invention that it will make only about ten per cent. of slack; fourth, to provide a machine which is adapted to drive narrow entries or tunnels, and to work with equal facility in wider spaces such as rooms; fifth, to provide a machine which is self-propelled, easily portable, and adapted to run on the ground or on a track through the various constricted passages in the mine; sixth, to provide a machine adapted to run on a cut made by itself, or conversely to provide a machine adapted to make a cut on which the machine may run; seventh, to provide a machine adapted to follow the vertical variations in the seam of coal; and, eighth, to provide a machine which may be steered sidewise while cutting, and is thus adapted to cut a curved entry or tunnel.

We have described our invention with reference to a machine for mining coal, to which end it is primarily adapted, but it is obvious that the machine could be used for tunneling in any kind of material, even the hardest of rock, as the form of the channeler bars and the method of their operation has been extensively practised for many years for channeling stone in quarries.

To these ends, our invention comprises, generally stated, a frame work mounted upon self-propelled and steerable wheels, which carries a motor driven air compressor and a number of channeling devices to cut the coal, together with the various auxiliary mechanisms and controlling devices, which will be more fully pointed out hereinafter.

Referring to the drawings, Figure 1 is a sectional plan through an entry in a coal mine, showing a plan view of our improved machine. Fig. 2 is a sectional side elevation through the same entry or tunnel, showing a side elevation of our improved machine. Fig. 3 is a sectional elevation taken on a vertical plane through the rear truck wheels. Fig. 4 is a side view which may be either a plan or an elevation of a set of channeler bars and the holding chuck for the same.

Fig. 5 is a cross section through the channeler bars taken on the line 1—1 of Fig. 4. Fig. 6 is a sectional elevation showing the mounting of the lower channeling cylinder. Fig. 7 is a plan view of the clamp or hinge for the same. Fig. 8 is an elevation showing the mounting of the upper channeling cylinder. Fig. 9 is a sectional elevation through the entry, showing the first operation of the machine. Fig. 10 is a similar view showing the first and second operations of the machine. Fig. 11 is a similar view showing one entire operation of the machine; and, Fig. 12 is a similar view, showing a variation on the operation shown in Fig. 11. Fig. 13 is an enlarged plan view of the mechanism for oscillating the side channelers.

Fig. 14 is a cross section through the parts 92 and 93, showing the arrangement of the locking pin 94.

Fig. 15 is a side elevation of the bracket 60 and connected parts.

Fig. 16 is a cross section through the bevel gear 43 showing the differential drive to the rear wheels.

Fig. 17 is a diagram of the various pressure operated devices and their pipe connections.

The machine consists of a frame 1, preferably formed of rolled or cast steel. At the forward end of the machine there is mounted an upper channeling cylinder 2, a lower channeling cylinder 3, and a pair of side channeling cylinders 4, of which only one is visible in the drawings.

The upper channeling cylinder 2 is mounted on a cross slide fixed to the frame 1 of the machine, and permitting the cylinder to be fed bodily across the machine. The cut made by the upper channeler 2 is normally horizontal, but an adjustment is provided by means of which it can be slightly inclined. The cylinder 2 is also pivotally mounted upon a sliding carriage, so that it may be oscillated horizontally, if desired. This arrangement is similarly carried out for the lower cylinder 3, and is shown in detail in Figs. 6, 7, and 8.

The cylinder 2 or 3 is pivoted by the bolt 5 to the clamp or hinge plate 6. The pin 7 having a shoulder 8 passes through the hinge plate 6, and is screwed into the slide 9 by threads 10, thus forming a rigid connection between the slide 9 and the pin 7.

The hinge plate 6 is provided with lugs 11, engaging corresponding lugs 12 on the cylinders 2 and 3. A pair of set screws 13 pass through a pair of holes 14 in the hinge plate 6, and are adapted to bear against the boss 15 on the cylinders 2 and 3. By means of these set screws 13, the cylinders 2 and 3 can be adjusted to a position parallel with the floor of the entry and roof, or at a slight angle to the same.

The hinge plate 6 is split, as shown at 16, and by means of the bolt 5, it may be clamped tightly to the pin 7, or the bolt 5 may be placed in such adjustment as to allow the hinge plate 6 to rotate freely around the pin 7 and oscillate the cylinders 2 or 3 thereabout.

A lug or projection 17 on the hinge plate 6 may be extended to form a lever, which may be operated by hand or any suitable mechanism, to oscillate the cylinder 2 or 3. The slides 9 are mounted upon guides 18, the same being rigidly secured to the frame 1. The pin 7 is provided with a lug 19 having the hole 20, by means of which a connection may be made to an operating device to actuate the slides 9 as will be hereinafter described.

The weight of the entire machine is supported upon four truck wheels, all of these being power driven. The front truck wheels 21 are also steerable, so that they may be placed in the position shown in Figs. 1 and 2, or the axle may be swung bodily to a position at right angles to that shown in Figs. 1 and 2.

Suitable mechanism adapted to drive and steer these wheels has been shown by us in a co-pending application bearing the Serial No. 470,292, and will not be described here in detail. The rear axle is of peculiar construction, as plainly shown in Fig. 3, in which 22 are channels forming parts of the frame 1, and 23 is an axle-housing secured thereto and provided with the bearings 24.

The wheels 25 are of the form adapted to ride either on the ground or on a track, and embody ground bearing flanges or treads 26, and rail bearing groove 27. The wheels 25 are mounted upon sleeves 28, having closed outer ends as shown at 29.

The inner ends of the sleeve 28 are enlarged to form the pistons 30, which may be provided with inserted soft packing 31, the same surrounding the floating axle 32, which serves to keep the various parts in line.

The pistons 30 work in the double cylinder 33, having the cylinder heads 34 provided with the stuffing box or glands 35 and the packing 36. A pipe 37 connects with ports 38 through the partition 39 leading to the inner ends of the double cylinder 33.

The wheels 25 are rigidly secured to the sleeves 28, both longitudinally and rotatively. The axle 32 is loosely fitted within the sleeves 28. Between each gland 35 and bearing 24, there is mounted upon the sleeve 28, a sprocket 40. These sprockets 40 are keyed to the sleeve 28 by feather keys, allowing the sleeves 28 to slip through them freely, and adapted to drive the sleeves 28 rotatively.

The combination as above described forms a pneumatically operated telescopic axle, the purpose of which is to permit of the machine being moved from place to place in the mine, on a standard gage mine track, which is usually of three or three and a half feet gage.

When the machine is brought to the place of working, it is run off the track onto the ground, so as to travel on a cut made by itself, and the telescopic axle is then extended to widen the gage to secure additional stability for the machine. This is desirable both on account of the more or less uneven surface of the mine floor, and also from the fact that the front truck wheels are intermittently thrown with their axle in line with the center line of the machine, in which case their stability is *nil*, and the rear axle is constrained to maintain the machine in an upright position.

Power for the operation of the machine is furnished by the internal combustion engine 41, which is illustrated as a two-cylinder vertical engine.

A bevel pinion 42 on the shaft of the engine 41 engages a bevel gear 43 mounted on a shaft 44, supported in the bearings 45, these latter being secured to the frame 1. The shaft 44 is a divided shaft,—a construction which is extensively used in automobiles, and will not be described here in detail.

The bevel gear 43 rotates loosely upon the divided shaft 44, and transmits power through a friction clutch 46 to a differential gear 47, which divides the power equally between the driving sprockets 48. Chains 49 connect the sprockets 48 on the shaft 44 with the sprockets 40, which drive the rear truck wheels 25. The above construction insures equal tractive effort of both wheels 25, whether the machine as a whole be running in a straight line or in a curve.

The internal combustion engine 41 is directly connected to an air compressor 50, which is here shown as a four-cylinder vertical machine, although any other convenient type may be used. 51 represents a flanged coupling between the engine 41 and the compressor 51, which may also act as a fly wheel.

The compressor shaft 52 is extended to the bearing 53, secured to the casting 54. The gear 55 is mounted loosely on the shaft 52 and connected thereto at will by the friction clutch 56.

The gear 55 meshes with and drives a gear 57 upon the shaft 58, supported in the bearings 59 and 60, the latter being bracketed to the casting 54. The shaft 58 carries a worm 61 driving a worm wheel 62 mounted on the vertical shaft 63.

From the compressor 50, compressed air is led to the reservoirs 64 by suitable piping, and from this latter by suitable flexible connections to the channeling cylinders 2, 3, and 4, and to other air operated devices, which will be described later.

The horizontal channeling cylinders 2 and 3 are fed across the machine by means of chains. The upper chain 65 passes around the sprockets 66 and 67. The sprocket 66 is mounted on a short shaft 68 supported in the bearings 69. The sprocket 67 is mounted on the shaft 70, one end of the same being supported in the bearings 71, and the other end being connected with a small double-acting two-cylinder reversing air motor 72, this latter being secured to the upper portion of the frame 1.

The lower horizontal channeling cylinder 3 is fed across the machine by a similar arrangement, comprising the chain 73, actuated by the sprocket 74 on the shaft 75, the same being supported in the bearing 76 secured to the frame 1.

The second sprocket 77 receives power from a chain 78 which is driven by a sprocket 79 on the shaft 70. By the above described mechanism, the cylinders 2 and 3 are simultaneously fed across the machine by the air motor 72.

The air motor 72 may be controlled and reversed manually by means of an ordinary four-way valve to reverse the flow of the fluid through the motor, or the four-way valve could be operated by mechanism actuated by the travel of the carriage 9, so as to make the travel of the cylinders 2 and 3 automatic.

The detail of the channeler bars is shown in Figs. 4 and 5. The bars are substantially square in section, there being four bars 80 of practically equal length and having cutting edges of any desired form.

The bars 80 are held in a chuck 81 having the set screws 82 to clamp the bars. This chuck is shown as being formed integral with the piston rod 83 of the cylinder 2, and may be so constructed for the cylinders 2 and 3.

In Fig. 2, we have shown a pair of arms 84, carrying a pin 85 upon which is mounted a roller 86. The chuck, 82, is provided with a forwardly extending arm 87, which bears upon the roller 86 and helps to sustain the weight of the channeler bars 80. A similar arrangement is used on the lower cylinder 3.

The channeler bars 80 are mounted in pairs outside of the central hollow square tube 88, as shown in Figs. 4 and 5. The purpose of the tube 88 is to carry a blast of air up the working points of the cutters to blow out the cuttings. This air may be supplied in various ways, as by a flexible pipe connecting to the rear of the chuck 81, and supplying air from any convenient source, as by using the exhaust air from the channeler cylinder itself, or by a small air pump; the former being more preferable.

A further detail of construction relating to the channeler bars 80 and chuck 81 is the tongues and grooves for alining the bars. Each channeler bar 80 has a tongue 89 at one side of the bar for the full length thereof, and a corresponding groove 90 at the other side of the bar. The square tube 88 is provided with a pair of tongues.

The tongues and grooves on the channeler bars may be formed in the rolls in which the bars are made, and the tongues on the hollow square tube 88 may be formed by taking a tube of greater thickness than is required and milling off a portion thereof to leave the tongue.

Corresponding grooves may be formed in the chuck 81 to receive the tongues of the bars, and it will be seen that this arrangement provides means for locking the bars together in such a way that they are always in perfect alinement for their full length.

If desired, the hollow square tube 88 may be omitted and a channeler bar used in its place. The details of the channeler bars and chucks are practically the same for cylinders 2, 3, and 4, the roller support being omitted, however, for the bars actuated by cylinder 4.

The cylinder 4 has a piston rod 91, the end of which is enlarged to form a boss 92. An extension rod 93 enters the boss 92 and is secured therein by a pin 94. There are two sets of holes drilled in the boss 92 at right angles to each other, either of which is adapted to receive pin 94.

The extension rod 93 carries at its forward end, the chuck 95, to which are secured the channeler bars 80. When the pin 94 is placed as shown in Fig. 2, the chuck 95 will be vertical, as shown in Fig. 2, and when the pin 94 is withdrawn, and the extension rod 93 is rotated 90 degrees, the pin 94 may then be inserted in the second set of holes to place the chuck 95 in a position at right angles to that shown in Fig. 2. This arrangement is duplicated on the two sides of the machine.

The extension rods 93 work through a guide 96, which is mounted to swing vertically in a casting 97 having a curved slot 98. The cylinder 4 is pivoted to the frame 1 by a pin 99, and adapted to oscillate in a vertical plane about the center of said pin.

The curved slot 98 is centered on pin 99 and is provided with gear teeth 100. The shaft 101 extends across the machine and carries at each end, pinion 102, which engages with the teeth 100 on the curved slots 98. The ends of the shaft 101 are journaled in bearings formed in the guides 96. The guides 96 are constrained to move in the curved slot 98.

Power is applied to the shaft 101 by a small double-acting two-cylinder reversing air motor 103, driving pinion 104, which meshes with the idler gear 105, which in turn drives the gear 106 on the shaft 101.

The idler gear 105 runs on the pin 107, which is supported by swinging links 108 and 109, these latter being journaled on the shafts 106 and 103ª, respectively. The air motor 103 is secured to the frame 1 of the machine, and is stationary.

The shaft 101 is adapted to move up and down vertically in the slot 98, and carry with it the guides 96. The motor 103 may be controlled in any convenient manner, such as that described for the motor 72.

In order to hold the guide 96 in a horizontal position adapted to make the middle cut 110, a locking device is provided, similar to that described in the co-pending application above referred to. This consists of a double-acting, double-ended cylinder 111, having a pair of pointed piston rods 112 working through fixed guides 113.

The lugs 114 are formed on the inside of the guide 96, and a hole is drilled in these lugs adapted to receive the piston rods 112. The piston rods 112 can be operated by supplying compressed air to the cylinder 111, so they can lock or unlock the guides 96 to allow oscillation of the cylinder and the connecting parts.

A further feature of our invention consists in a pair of conveyers mounted one on each side of the machine, and designated as a whole by the numeral 115. These conveyers may be of any desired construction, and are here shown as apron conveyers, each consisting of a pair of sprocket chains 116, having secured thereto cross flights 117. These chains pass around lower sprockets 118 and upper sprockets 119 and 120, the latter of which is the driver.

Side guards 121 are provided to retain the coal on the conveyers, and a hopper 122 is provided around the lower end of the conveyer, into which the slack coal may be shoveled by the attendant.

Both conveyers are driven by a small two-cylinder air motor, similar to those previously described and designated by numeral 123. The shaft of this motor, 124, carries a sprocket 125 driving a chain 126, which in turn drives a sprocket 127 on a shaft 128 upon which is mounted the driving sprockets 120 for the conveyers.

Both conveyers discharge into a box-shaped chute 130, having inclined ends down which the coal is adapted to flow by gravity to a central discharge portion, which is provided with a pivotally attached delivery chute 129, from which the coal is delivered to the mine car 132.

The conveyers 115 are intended to be run constantly at a slow speed when the machine is at work, and the purpose of having two conveyers is so that one will always be in a position to be conveniently reached by the operator.

As the channeling cylinders 2, 3, and 4 are independently actuated, each from their own air supply, it is obvious that the machine may be operated in various ways, and, therefore, we do not limit ourselves to any certain method of operating it. For the purpose of driving narrow entries in a coal mine, the preferred method of operation is as follows:

The machine is brought to the working place and placed in substantially the position shown in Fig. 1, except that the points of the channeling tools 80 are adjacent to the coal. Compressed air is then fed to the channeling cylinders 2, 3, and 4, upon which the channeler bars 80 start to reciprocate. At the same time, compressed air is applied to the motor 103 to effect a slow oscillatory movement of the cylinders 4, and also to the motor 72 to effect a slow cross travel of the cylinders 2 and 3.

At the end of the oscillation of the cylinder 4, and of the cross travel of cylinders 2 and 3, the channeler bars 80 will have cut four grooves in the coal to a certain depth, say six inches. The upper channeler bars, actuated by cylinder 2, will cut the groove 133, as shown in Fig. 9; the lower channeler bars will cut groove 134; and the side channeler bars, actuated by cylinders 3 and 4, will cut grooves 135 and 136, as shown in Fig. 9.

The depth of the groove cut will depend upon the hardness of the coal, the rate at which the channeler bars 80 are reciprocated, the condition of the cutting edges of the channeler bars 80, and the rate of feed of the channeler bars 80 across the cuts.

After the completion of the swinging motion for each channeler bar, or for each gang of channeler bars, the whole machine will be moved forward without stopping the action of the channeler bars, a distance equal to the depth of the first cut. This action will be repeated until the channeler bars have cut their full depth of the coal, as shown in Fig. 2.

Upon the completion of this action, the whole machine will be propelled rearwardly until the channeler bars 80 are out of their cuts. The front end of the machine will then be swung to the opposite side of the entry by throwing the front track wheels with their axle parallel to the length of the machine and applying power to them.

A second set of cuts will then be made at the other side of the entry, after which there will be eight cuts, as shown in Fig. 10. This last process completes the four vertical cuts.

The machine is then propelled rearwardly to disengage the channeler bars, as before, and the guides 96 are locked in their middle horizontal position by the action of the locking cylinder 111, whereupon the front end of the machine is swung clear across the entry by means of the action of the front truck wheels as before, to make the middle portion of the horizontal cut 137, the middle portion of the horizontal cut 138, and the entire middle cut 139. This last operation completes the cutting action of the machine as applied to an entry of coal being subdivided into six lumps, four of which are of equal size and rectangular, and the middle two of which are of larger size and of a shape similar to the key-stone of an arch.

The machine may then be backed away close up to the side of the entry, the lumps disengaged by wedging, or by hydraulic means.

It will be obvious that the proportional size of the blocks of coal thus made can be varied as desired; that the number may be diminished or increased as desired; and that a greater or less number of either horizontal or vertical cuts may be made without departing from the scope of our invention.

It will also be obvious that all the horizontal cuts may be made by first swinging the machine across the entry and feeding it forward as the cuts grow deeper, after which the vertical cuts may be made in pairs.

In certain coal seams, particularly those in the Pittsburgh district, there often occurs in the coal a band or bands of slate, which it is desirable shall not be included in the shipment of merchantable coal, but shall be separated entirely from the coal and be pulverized with the slack, so that they are not shipped with the lump coal. A feature of our invention is means by which these bands can be pulverized, and to this end, we have provided the middle channeler bars, actuated by cylinders 4, with a rotative adjustment, by means of which they may be either set to make a thin cut, as shown at 139, when they are fed edgewise in the cut; or, they can be made to make a comparatively wide cut as shown at 140 in Fig. 12, in which case they are fed sidewise through the cut.

As a power equipment for our invention, we have shown a prime motor in the form of a gasolene engine. Recent developments in gasolene engine construction have made this form of motor a reliable and durable source of power, and the employment of it for the purposes above described would give each machine in the mine an independent supply of power, so that failure of a central power plant, such as would be used to generate compressed air or electric power, could not affect the operation of all the machines. It is obvious, however, that an electric motor could be used to replace the gasolene motor shown with equally satisfactory results, so far as relates to the machine itself.

During the cutting action of the channeler bars, considerable amount of fine cuttings or slack will be made, and it is desirable to remove these promptly so that the floor may be clear and not impede the truck wheels. For this purpose, we have provided a pair of conveyers, into either of which the said slack may be shoveled, as fast as made, and automatically loaded into mine cars at the rear of the machine.

Various modifications in the construction and use of such a machine may be made by those skilled in the arts of designing and using such machines, without affecting the scope of our invention, as covered by the following claims:

1. In a mining machine, a frame, a pair of guides one above the other on said frame, an adjustable carriage on each of said guides, a horizontally operating channeler on each of said carriages, and means for setting both of said channelers at either side of the frame.

2. In a mining machine, a frame, a reciprocating channeler of elongated, rectangular section pivotally mounted thereon for oscillation in a vertical plane, a pivoting center at the rear of said frame, and means for swinging the front end of said frame about said pivot.

3. In a mining machine, a frame, a pair of wheels at the rear end thereof about which the frame may pivot, a channeler of rectangular section pivoted on a horizontal pivot secured to said frame, means for feeding the cutting end of said channeler bar edgewise to make a deep narrow vertical cut, and means for swinging the frame and the cutting end of said channeler bar sidewise to make a deep wide horizontal cut.

4. In a mining machine, a frame pivoted at one end, a reciprocating channeler bar of elongated rectangular section pivotally mounted thereon to oscillate in a vertical plane, means for swinging the frame in a horizontal plane, and a locking device constraining said bar to oscillate in said horizontal plane.

5. In a channeling machine, a reciprocating channeler bar of elongated, rectangular section pivotally mounted to oscillate in a vertical plane, a guide for said channeler provided with a hole and pin arranged to enter said hole to lock said channeler in a level position, and a fluid pressure cylinder for operating said pin.

6. In a mining machine, a frame, a reciprocating channeler bar of elongated, rectangular section pivotally mounted at each side thereof for oscillation in a vertical plane, a plurality of channelers mounted one above the other between said oscillating channelers and arranged to make horizontal cuts in the coal, a pivoting center at the rear end of said frame and means for swinging said frame horizontally about said pivot.

7. In a mining machine, a power operated horizontal reciprocating cutting device adapted to make a horizontal cut in the coal seam, a plurality of power operated cutters adapted to make shearing cuts in the coal, means to swing the last mentioned cutters horizontally together with the frame, whereby the coal may be severed in horizontal planes and between the shearing cuts.

8. In a mining machine, a frame, a cutter of elongated, rectangular section to make a horizontal cut, reciprocating cutting means to make a shearing cut, and power actuated means to advance or withdraw the horizontal cutter so as to make substantially a cut square with the face and of substantially uniform depth.

9. In a mining machine, a reciprocating frame, a cutter of elongated, rectangular section mounted on said frame and arranged to make a horizontal cut and a shearing cut, said shearing cut being made independently of said horizontal cut, a motor, a longitudinal shaft, and connections between said motor and said longitudinal shaft, power actuated means to move the frame holding the cutting elements sidewise and power actuated means to move the frame forward and backward, so as to position the horizontal cutter to its work as it moves sidewise.

10. In a mining machine, a reciprocating frame, a cutter of elongated, rectangular section mounted on said frame arranged to be positioned in a vertical arc, means to feed the cutter into the coal and to swing the frame and cutter sidewise so as to cut a horizontal line in the face of the coal and means to make the plane of its cut inclined to a horizontal cut, power actuated means to move the frame forward, backward and sidewise.

11. In a mining machine, a reciprocating frame, a cutter of elongated, rectangular section mounted on said frame arranged to be rotated about a longitudinal axis, power actuated means to make a cut with said cutter in one plane, means to lock said cutter in position after it has been rotated about its axis, power actuated means to swing the frame and cutter causing said cutter to make a cut at an angle to first mentioned cut, power actuated means to move the frame forward and backward.

12. In a mining machine, a reciprocating frame, a cutter of elongated, rectangular section supported on said frame arranged to be rotated about a longitudinal axis, means to make a cut with said cutter in one plane, means to swing said frame and said cutter together and to make a cut at an angle to first mentioned cut after said cutter has been rotated about said axis, power actuated means to move the machine forward and backward.

13. In a mining machine, a reciprocating frame, a cutter of elongated, rectangular section supported on said frame arranged to be positioned at any selected height, power actuated means to position said cutter, power actuated means to swing the frame holding said cutter and said cutter horizontally about a center, power actuated means to move the machine forward and backward.

14. In a mining machine, a reciprocating frame, a horizontal cutter, of elongated, rectangular section, a cutter of elongated, rectangular section arranged to make a cut at an angle to said horizontal cutter, means to advance said cutters to their work, power actuated means to swing each cutter about a center as it moves in its plane of operation.

15. In a mining machine, a frame, a plurality of cutters supported on said frame, power actuated means to swing the frame and cutters sidewise and power actuated means to move some of the cutters through the coal sidewise independently of the movement of the frame, means to advance the frame, means to move it rearwardly and means to move it sidewise.

16. In a mining machine, a frame, a plurality of cutters supported on said frame, power actuated means to swing the frame and cutters sidewise and power actuated means to move some of the cutters through the coal sidewise and independently of the movement of the frame, a shearing cutter, means to advance the frame, means to move it rearwardly and means to move it sidewise.

17. In a mining machine, a reciprocating frame, a horizontal cutter and a shearing cutter supported on said frame, both of said cutters of elongated, rectangular section and means independent of the means for moving said frame to feed either of said cutters across the coal in the plane of their cuts.

HARRY A. KUHN.
WALTER W. MACFARREN.

Witnesses:
ESTELLE M. JOHNSON,
CHAS. FOXTERMAN.